United States Patent [19]

Dry

[11] 4,344,546

[45] Aug. 17, 1982

[54] REUSABLE TIGHT HEAD DRUM BY CONVERSION TO OPEN HEAD DRUM

[75] Inventor: Sidney Dry, Chicago, Ill.

[73] Assignee: Natico, Inc., Chicago, Ill.

[21] Appl. No.: 249,694

[22] Filed: Mar. 31, 1981

[51] Int. Cl.³ ............................................ B65D 45/32

[52] U.S. Cl. .................................... 220/320; 220/67; 220/319; 229/5.6

[58] Field of Search ................. 220/319, 320, 321, 67; 292/256.67, 256.66; 229/5.6

[56] References Cited

U.S. PATENT DOCUMENTS 2,108,944 2/1938 Rheem ........................... 220/320 X 3,204,811 9/1965 Fine .................................... 220/320

3,346,139 10/1967 Armstrong, Jr. .................. 220/320

3,955,705 5/1976 Dubois et al. .................. 229/5.6 X 3,984,045 10/1976 Blank .................................. 229/5.6

*Primary Examiner*—George T. Hall

*Attorney, Agent, or Firm*—McDougall, Hersh & Scott

[57] ABSTRACT

The elements making up the closure of a tight head drum which enables conversion to an open head drum for reuse of the drum in which the drum is formed with a curl at the upper end on which an annular loop of a top head is secured by a banding ring member having a leg portion which is turned inwardly and upwardly to secure the loop onto the curl in a high strength sealed engagement.

16 Claims, 6 Drawing Figures

REUSABLE TIGHT HEAD DRUM BY CONVERSION TO OPEN HEAD DRUM

This invention relates to a convertible drum and particularly to the elements for assembly of a tight head drum which can be converted for reuse to an open head drum.

BACKGROUND OF THE INVENTION

Drums of 55–60 gallon capacity are generally provided in two forms, known in the trade as tight head drums and open head drums. In a tight head drum, the top and bottom covers are secured by chimes in sealing relation with the top and bottom of the barrel of the drums. Access for filling the drum with liquid is usually through a plugged opening through the top while the liquid content material is removed through a smaller plugged bung hole in the top or in the side wall of the drum. In an open head drum, use is made of a removable cover, having a peripheral looped portion that fits over a curl in the upper edge of the drum, and the cover is secured in a position of use to seal the open end of the drum by a removable locking ring which fits about the interfitting loop and curl to secure the elements in their assembled relation. The content material is introduced through the open end of the drum before the cover is secured and the content material is removed through the open end of the drum after the cover has been removed.

By reason of the means for closure of tight head drums, and by reason of the inaccessibility to the interior of the drum for cleaning without removal of the end closure, tight head drums do not enjoy the economy of reuse. Removal of the cover for cleaning the interior requires reconstruction of the end closure system for reuse, and this at considerable expense.

OBJECTS OF THE INVENTION

It is an object of this invention to produce a tight head drum in which use is made of components for drum closure which enable conversion of the tight head drum to an open head drum for reuse, without requiring the reconstruction thereof.

DESCRIPTION OF THE DRAWINGS

These and other objects of this invention will hereinafter appear and for purposes of illustration, but not of limitation, an embodiment of the invention is shown in the accompanying drawings in which.

DESCRIPTION OF THE INVENTION

Figure 1:
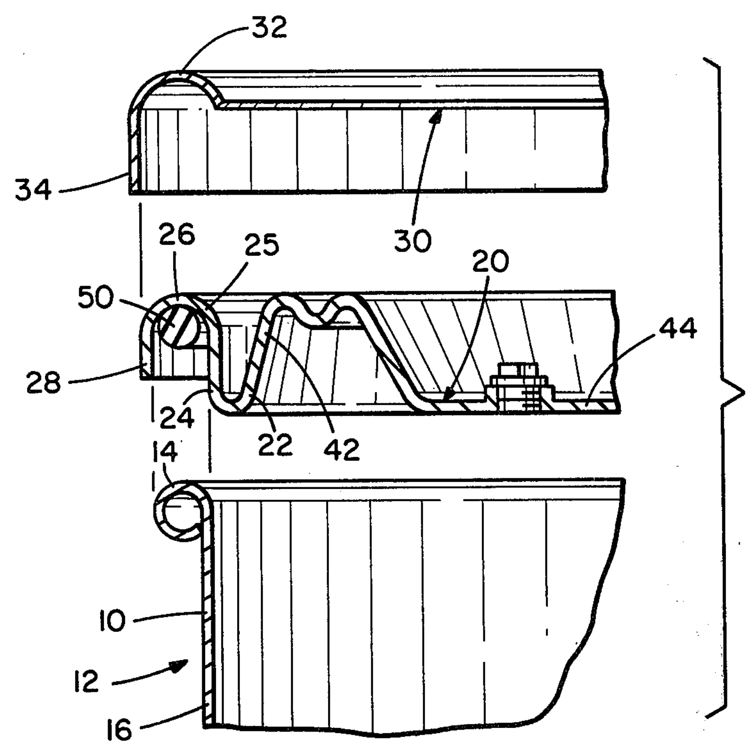
FIG. 1 is a sectional elevational view of portions of the elements in relative position for assembly into a tight head drum.

In FIG. 1, illustration is made of the open end portion 10 of a drum 12 with a curl 14 formed around the upper end portion thereof. The body 16 of the drum can be formed of fiberboard, plastic or metal, but preferably of steel, while the upper end portion containing the curl 14 is normally formed of a metal. The curl 14 is in the form of a circular section extending continuously outwardly from the upper edge of the drum until the free edge turns back to engage the outer wall immediately adjacent the upper edge of the drum.

The top head 20, which may be fabricated of steel or plastic, comprises a disc like cover member of circular shape dimensioned to span the open end of the drum. Spaced inwardly from the outer edge of the top head is a downwardly extending annular groove 22 the outer wall 24 of which defines a circular section having a diameter substantially corresponding to the inner diameter of the drum adjacent the curl 14. Thus, when the annular groove portion of the top head telescopes into the open end of the drum, the outer wall 24 of the groove 22 bears against the inner wall of the drum as a resilient backing. The portion of the top head 20 extending beyond the annular groove is in the form of a downwardly extending loop 26 having an internal diameter slightly greater than the outer diameter of the curl 14 and with a peripheral skirt 28 extending downwardly substantially parallel to the outside wall of the drum and dimensioned to have a length to extend below the curl 14, when in the preassembled relation. In the illustrated modification, the annular groove 22 extends downwardly to a level greater than the annular skirt 28 so that the outer drum engaging wall portion of the groove extends to a level below the skirt 28.

The ring member 30 is formed of a deformable metal, such as steel, having a diameter corresponding to the outer wall diameter of the skirt 28 of the top head 20 with the upper end portion 32 of the ring member extending curvilinearly inwardly through an angle of about 180° along a curvature corresponding to the outer wall of the curvilinear section 25 of the top head with the leg 34 of the ring member having a length greater than the length of the skirt 28 so as to extend below the end of the skirt when the ring member 30 is seated onto the circular section 25 of the top head.

In the preferred practice of the invention, the top head 20, which functions as the cover, is formed with an upwardly extending corrugated section 42 located a short distance inwardly of the annular groove 22 with the body 44 of the top head at about the level of the base of the annular groove whereby the top head cover is characterized by resiliency sufficient to insure firm engagement with the drum to effect a relatively tight seal between the inner wall 16 of the drum and the outer wall 24 of the groove, when the top head is inserted in the assembled relation to close the open end of the drum.

Figure 2:
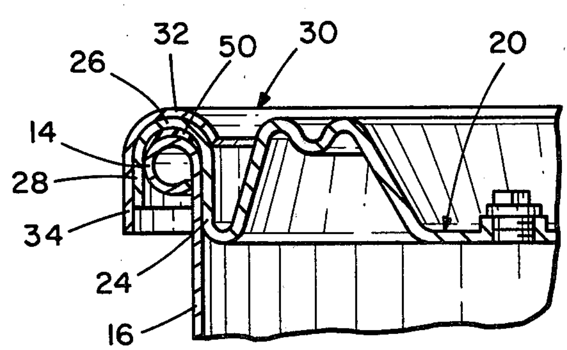
FIG. 2 is an elevational view of the elements shown in FIG. 1 in relative position in an initial stage of assembly.

In assembly, the top head 20 is pressed downwardly onto the open end of the drum with the curvilinear section 25 seated onto the end curl 14 and with the outer wall 24 of the annular groove 22 telescoped into the upper end portion of the drum 10 so that the outer wall of the annular groove abuts against the inner wall of the drum adjacent the open end. The ring 30 is then placed onto the curvilinear section, as illustrated in FIG. 2 of the drawings. When a sealing member is empolyed, the gasket in the form of a ring 50 of gasket material is provided in the circular section 25 of the top head and downward pressure is applied to the assembled members. The amount of pressure determines the amount of compression of the gasket material and the extension of the endless steel ring 34 below the top curl of the drum. Instead of making use of a preformed ring of gasket material, sealing material may be injected into the area between the curl 14 and the embracing circular section 25 during assembly.

Figure 3:
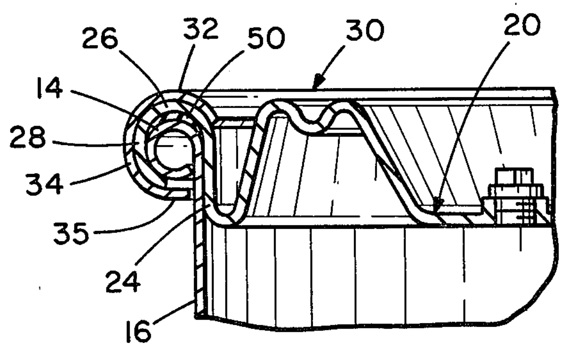
FIG. 3 is a view similar to that of FIG. 2 showing the elements at a later stage of assembly.

While continuing to apply downward pressure onto the assembled members, a forming tool engages the bottom leg 34 of the endless steel ring while the tool and drum are in relative rotational movement to form the engaged leg portion inwardly curvilinearly to extend substantially horizontally toward the vertical outer wall of the drum, but preferably short of engagement with the drum wall, as illustrated in FIG. 3 of the drawings. This operation provides a sealed relation about the open end of the drum which is as good, if not better, than is normally obtainable with a standard open head drum, as secured by a locking ring, but it still lacks the mechanical strength of a tight head drum.

Figure 4:
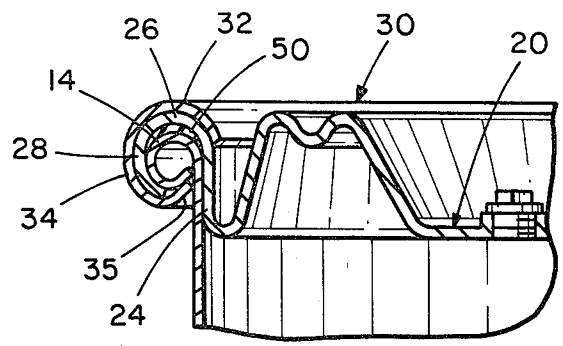
FIG. 4 is a sectional elevational view showing the elements of FIGS. 2 and 3 in their final stages of assembly.
Figure 5:
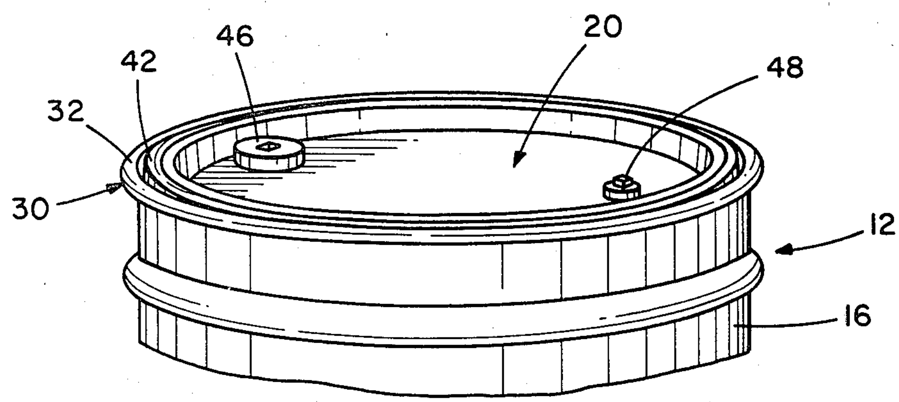
FIG. 5 is a perspective view of a tight head drum embodying the features of this invention.
Figure 6:
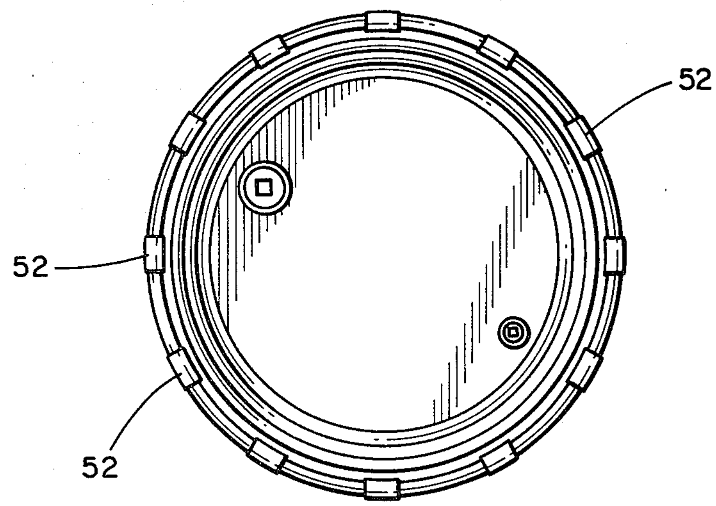
FIG. 6 is a top plan view showing a modification in a tight head drum embodying the features of this invention.

Thus, in a final operation, the inwardly extending leg 35 of the annular ring 30 is further deformed to extend upwardly to an angle of about 45° with the horizontal, as shown in FIG. 4, as by means of a forming die in relative rotational movement with the drum. This operates further to tighten the closure with nearly a 270° wrap of the annular (steel) band about the curl 14 and annular loop 26 of the top head 20. This gives the closure the full mechanical strength desired for performance substantially equal to a tight head drum. In practice, the top curl of the open head drum is deformed slightly by the latter operation for maximizing the strength of the closure without detracting from the convertibility for reuse of the drum as an open head drum.

As in conventional tight head drums, the top head can include a bung 46 as an inlet and a separate bung 48 as an outlet for the content material.

The upward forming of the inwardly extending end portion 35 of the ring provides strength sufficient to enable use of a banding member other than an endless ring of the type described. For example, use can be made of a spirit band, or separated bonding members 52 which are more easily removed.

For conversion to an open head drum for reuse, the ring member 30 or other banding member, such as elements 52, is removed to free the top head for removal leaving the open drum with a curl 14 about the open end, which is conventional for an open head drum. Thus the drum can be cleaned and shipped with a cover and locking ring of conventional construction for reuse by conversion as an open head drum.

It will be apparent from the foregoing that I have provided a tight head drum assembly, with elements that enable easy conversion of the tight head drum to an open head drum for reuse in a relatively simple and efficient manner.

It will be understood that changes may be made in the construction, arrangement and operation without departing from the spirit of the invention, especially as defined in the following claims.

I claim:

1. A tight head drum embodying features for convertability for reuse as an open head drum comprising a drum having an outwardly extending curl at its upper end, a top head dimensioned to span the open upper end of the drum, an annular looped portion extending curvilinearly outwardly from the edge of the top head having an interior curvature corresponding to the curvature of the curl for enabling the curl to rest within the looped portion, an annular skirt extending downwardly from the outer edge of the looped portion and spaced in substantially parallel relation to the outer wall of the drum and for a distance to extend to a level below the curl, and a banding member having an upper curvilinear portion shaped to receive the looped portion in nesting relation and a leg portion extending downwardly from the outer edge of the curvilinear portion dimensioned to have a length greater than the length of the skirt of the top head.

2. A tight head drum as claimed in claim 1 in which the banding member is in the form of an endless ring having a diameter corresponding generally to the diameter of the annular looped portion of the top head.

3. A tight head drum as claimed in claim 1 in which the banding member comprises a split ring member having a diameter corresponding to the diameter of the curl for receipt of the looped portion of the top head in nesting relation therein.

4. A tight head drum as claimed in claim 1 in which the banding member comprises a number of separate segments for securing the top head and curl in their assembled relation.

5. A tight head drum as claimed in claim 1 which includes a ring of gasket sealing material dimensioned to be received between the curl and the looped portion during assembly of the top head into the drum.

6. A tight head drum as claimed in claim 1 which includes an annular downwardly extending groove in the top head substantially continuous with the inner end of the looped portion.

7. A tight head drum as claimed in claim 6 in which the annular groove is spaced inwardly from the edge of the top head and is dimensioned to have an outer wall to wall dimension corresponding somewhat to the inner wall to wall dimension of the drum adjacent the open curl end portion for backing the upper end of the drum when the top head is inserted in position for closure of the upper open end of the drum.

8. A tight head drum as claimed in claim 1 in which the top head includes a central body portion and an upwardly extending corrugated portion between the annular groove and the body portion.

9. A tight head drum as claimed in claim 7 in which the body portion of the top head extends at a level of about the level at the base of the annular groove.

10. The method of assembly of the elements of claim 1 to form a closure effective as a tight head drum comprising nesting the annular looped portion of the top head onto the curl at the upper end of the drum, nesting the banding member onto the looped portion, turning the loop of the banding member to extend substantially horizontally inward across the underside of the curl, and then bending the inwardly extending horizontal portion of the leg angularly upwardly to extend about 45° from the horizontal to effect a strengthened assembly of the top head onto the drum.

11. The method as claimed in claim 10 which includes the step of applying downward pressure into the assembled members while turning the leg inwardly to effect interengagement between the members.

12. The method as claimed in claim 11 which includes the step of inserting a ring of gasket material between the curl and loop before the application of pressure.

13. The method as claimed in claim 11 which includes the step of injecting a sealing material between the curl and loop before bending the leg inwardly to effect the assembled relation.

14. A tight head drum as claimed in claim 1 in which the banding member is formed of a deformable metal.

15. A tight head drum as claimed in claim 1 in which the looped portion is formed of a metal or plastic.

16. A tight head drum as claimed in claim 1 in which the curl is formed of a metal or plastic.

* * * * *